United States Patent [19]

Christian et al.

[11] 4,237,612
[45] Dec. 9, 1980

[54] FASTENER GRIP LENGTH MEASURING SYSTEM

[75] Inventors: Earl L. Christian; Ronald D. Blunck, both of San Diego, Calif.

[73] Assignee: General Dynamics, San Diego, Calif.

[21] Appl. No.: 24,990

[22] Filed: Mar. 29, 1979

[51] Int. Cl.³ .......................... G01B 5/06; G01B 7/06
[52] U.S. Cl. ................................. 33/143 L; 33/125 C; 33/147 N; 33/172 E
[58] Field of Search ............. 33/125 C, 143 L, 143 G, 33/147 K, 147 N, 169 B, 172 E

[56] References Cited

U.S. PATENT DOCUMENTS

| 3,016,619 | 1/1962 | Mueller | 33/147 K |
| 3,225,447 | 12/1965 | Bryant | 33/147 K |
| 3,979,835 | 9/1976 | Sumption et al. | 33/169 B |
| 4,008,523 | 2/1977 | Von Voros | 33/125 C |
| 4,103,427 | 8/1978 | Ledley | 33/125 C |

FOREIGN PATENT DOCUMENTS 475353  5/1915  France .................................. 33/169 B Primary Examiner—Richard R. Stearns
Attorney, Agent, or Firm—John R. Duncan; Frank D. Gilliam

[57] ABSTRACT

A totally portable, hand-held measuring device utilizing an insertable sliding probe to measure material or structural part thicknesses. The position of the probe actuates electronic circuitry which digitally displays the grip length of the fastener to be selected. The device provides a fast and accurate means of determining the fastener with the correct grip length for each assembly.

4 Claims, 12 Drawing Figures

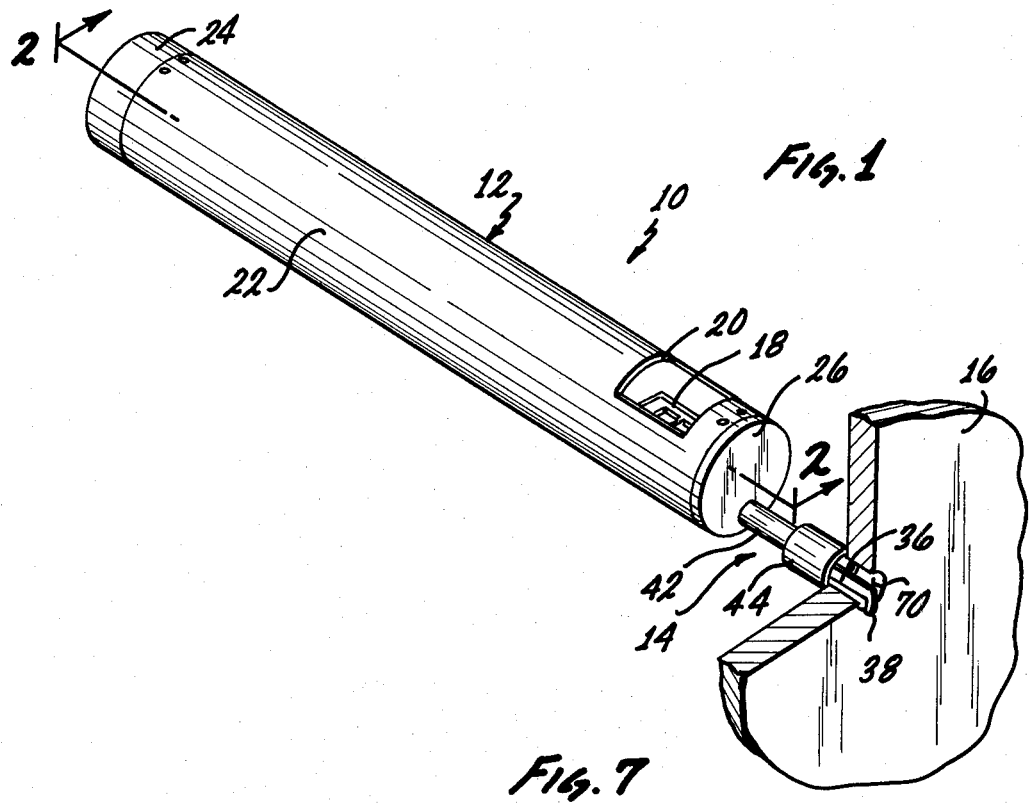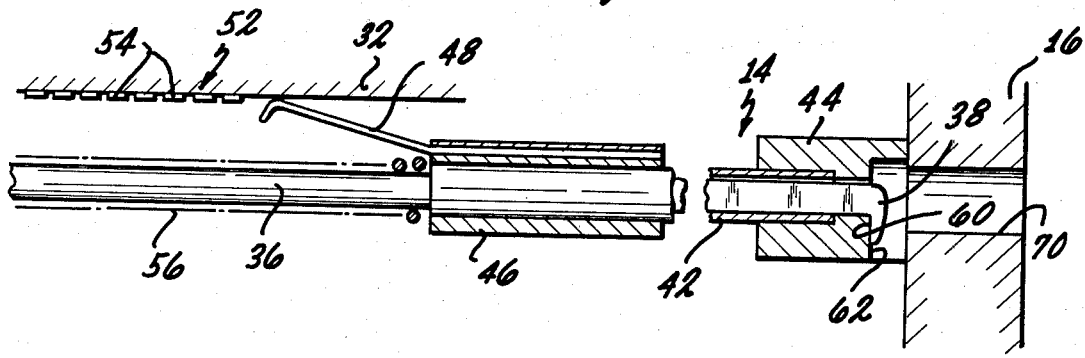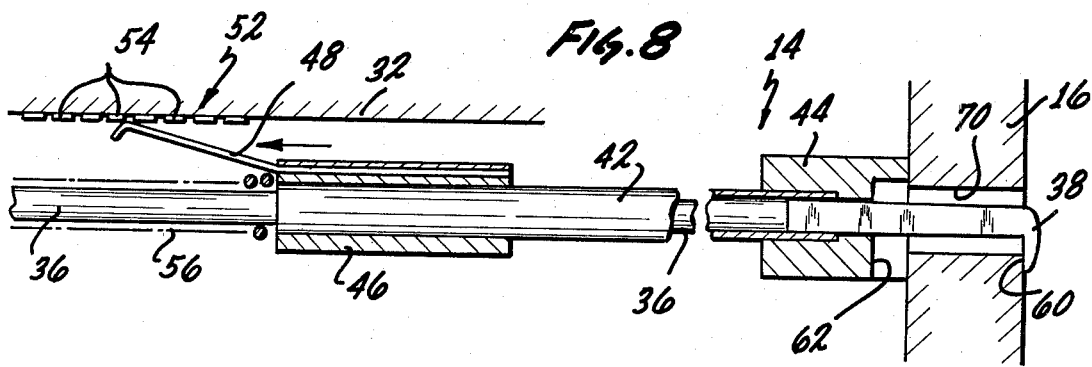

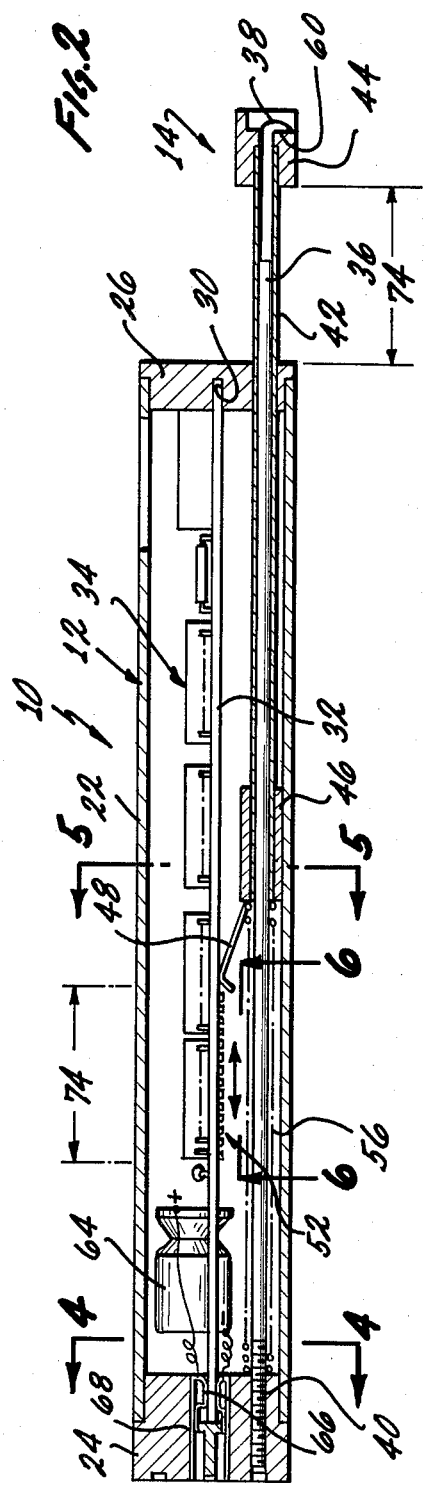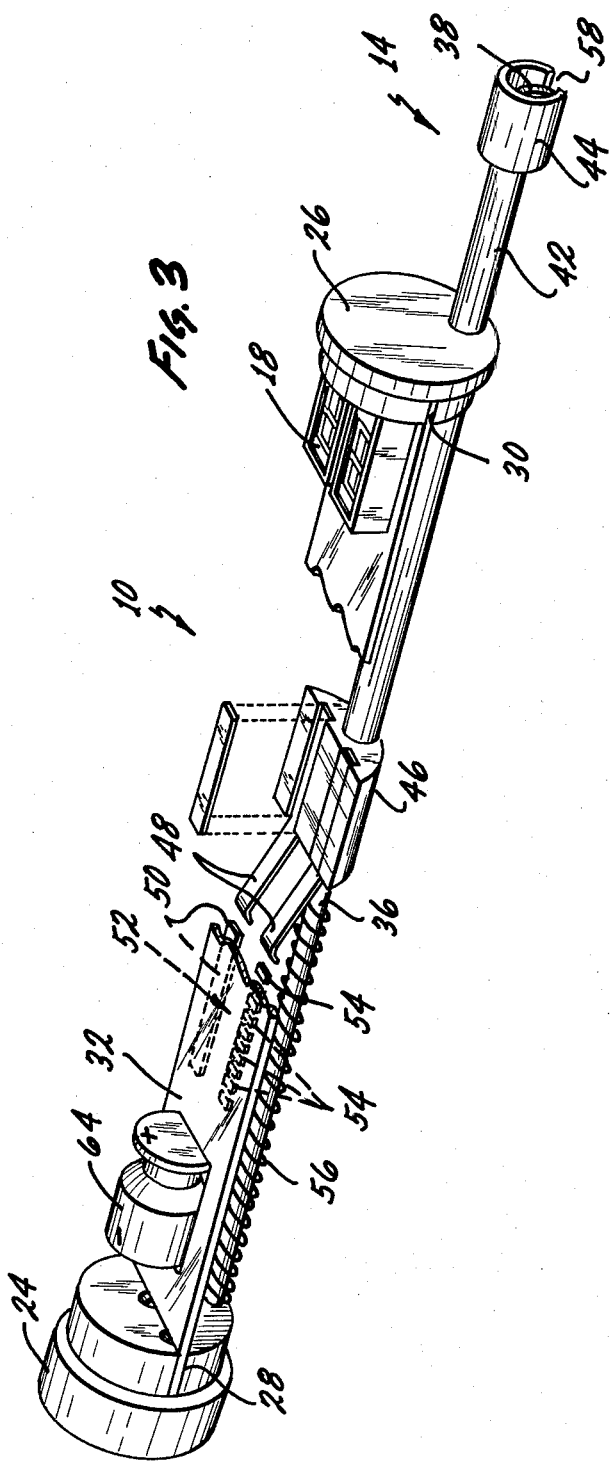

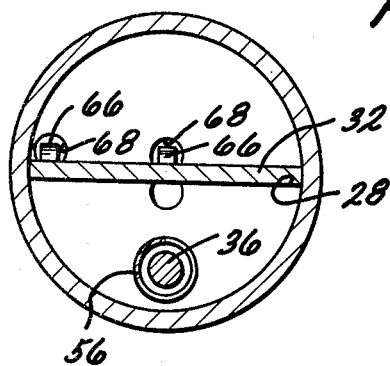
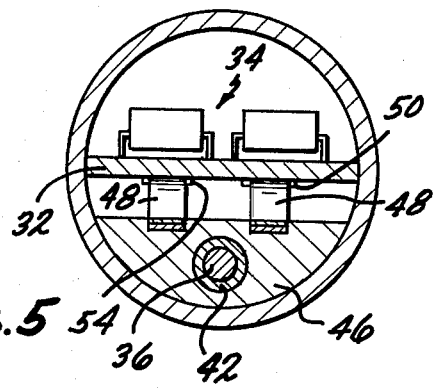
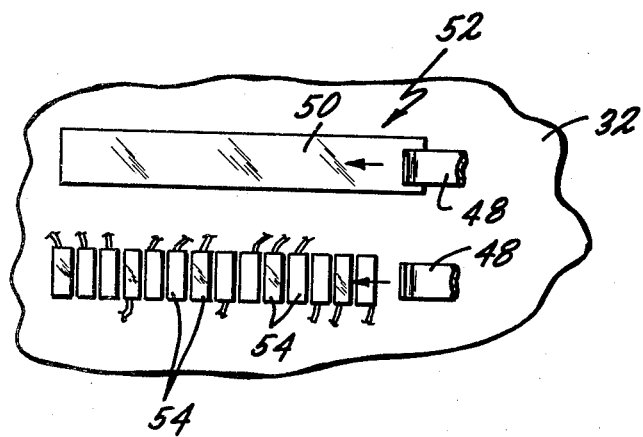
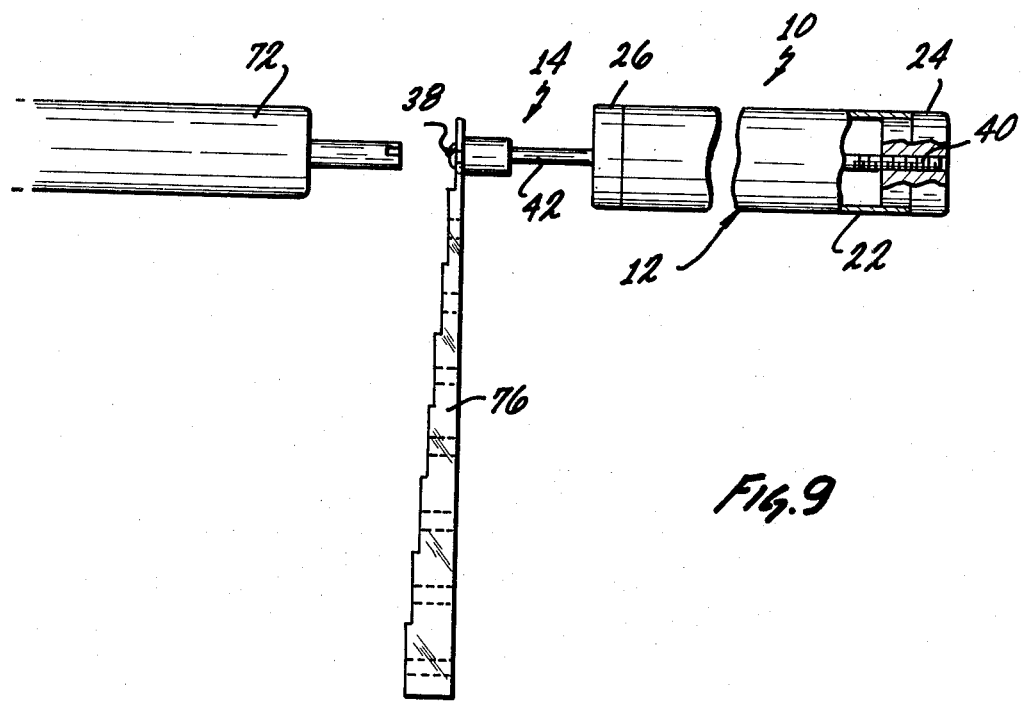

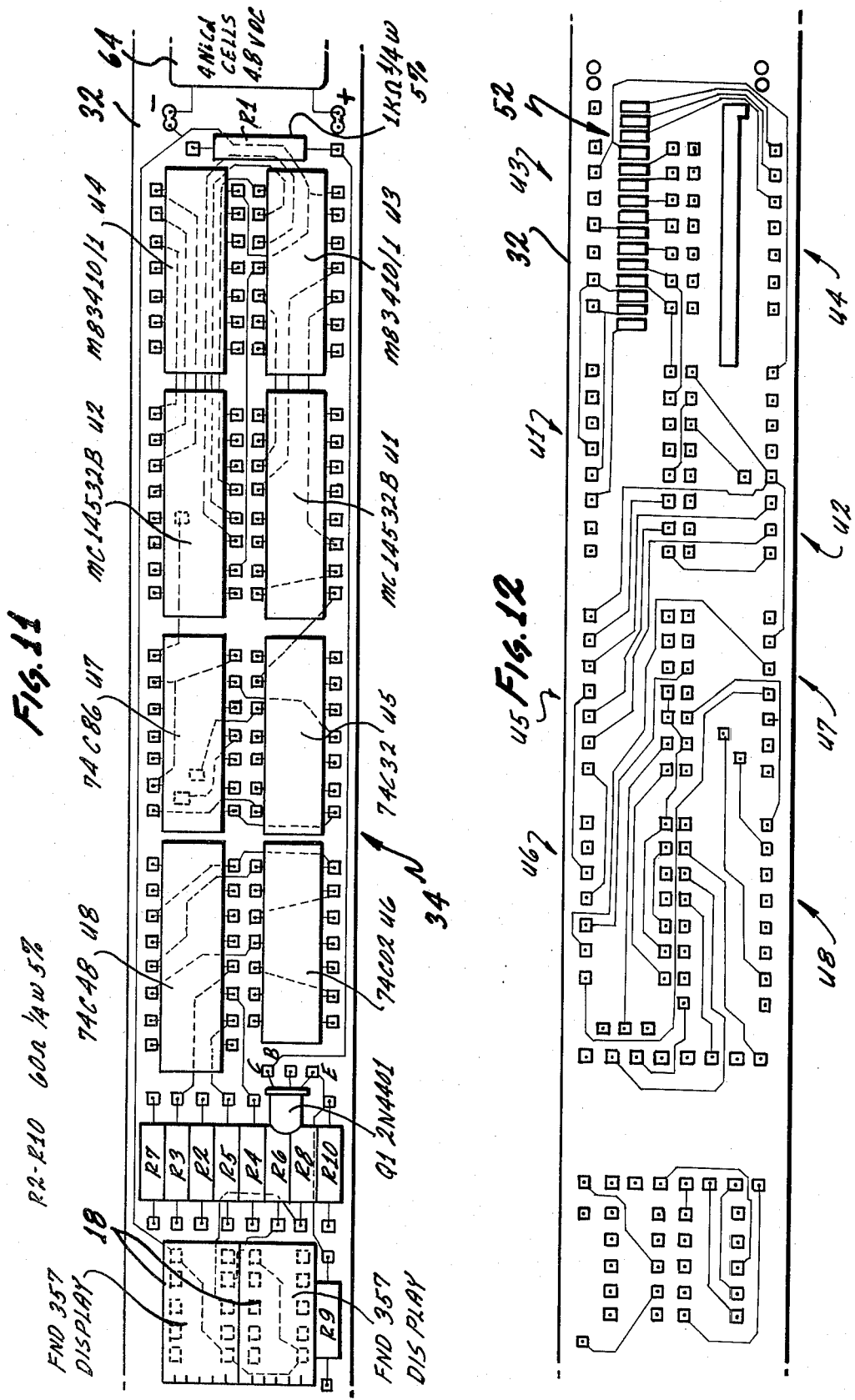

FASTENER GRIP LENGTH MEASURING SYSTEM

BACKGROUND OF THE INVENTION

This invention is an improved version of extant systems which measure thicknesses of material and structural parts (particularly thicknesses of skins and associated detail parts of aerospace structures) such that the correct-length fastener can be fitted to hold the skins and parts together.

The present system for determining aerospace structures' various fastener grip lengths employs a mechanical scale (about six inches in length), which is inserted in a hole in the structural parts to be fastened. The scale gauge is easily misread by observers, particularly when, as frequently is the case, the gauge must be read in poorly lit areas. This causes the wrong fastener to be fitted which, in turn, causes costly rework.

Thus, there is a need for a system which is precise, is fast, and provides repeatable measurements of different material and part's thicknesses so that the correct fastener may be fitted initially.

Accordingly, the primary object of this invention is to improve the present fastener grip-length determination method by providing a system which is capable of meeting the aforementioned needs.

SUMMARY AND AN ADDITIONAL OBJECT OF THE INVENTION

The fastener grip-length determining device which accomplishes the foregoing object comprises a relatively small housing, capable of being handheld, which contains an extended probe with internal sliding electrical contacts for detecting material thicknesses. The sliding probe's position relative to the housing determines the thickness of the measured material, which is correlated with switching circuitry within the housing; the circuitry, in turn, actuates a digital, numeric display. The circuitry and display are correlated to the incremental lengths of groups of fasteners so that the display unequivocally, legibly, and precisely indicates the number corresponding to length of the fastener to be used.

Optional adaptations through hybrid circuitry would permit smaller packaging, and thickness measuring, for other applications. The system can also be provided with shock-resistant and moisture-resistant coatings for added protection.

An additional object of this invention is to provide a measuring gauge with a digital readout, calibrated in lengths of groups or sets of fasteners to be selected for use.

BRIEF DESCRIPTION OF THE DRAWINGS

FIG. 1 is a perspective view of the measuring system, constructed in accordance with the teachings of this invention, shown in position for measuring the thickness of structural parts, FIG. 2 is a cross-sectional view of the measuring system partially cut away, to show the inside details of the system, FIG. 3 is a perspective view with the casing removed, partially exploded and partially cut away, to show the relationship of the various parts within the casing, FIG. 4 is a cross-sectional view taken along line 4—4 of FIG. 2, FIG. 5 is a cross-sectional view taken along line 5—5 of FIG. 2, FIG. 6 is a partial view taken along line 6—6 of FIG. 2, looking in the direction of the arrows and enlarged to show the details of the wiper contacts and the terminals for changing the numeric output of the display, FIGS. 7 and 8 are views of the various terminal contacts and the measuring probe; FIG. 8 being the position of the probe when measuring the thickness of the structural parts, FIG. 9 is a simplified view of a means for calibrating the measuring system for groups of fasteners according to grip lengths, FIG. 11 shows the location of each electrical component on the top of the system's printed circuit board, and FIG. 12 is a view of the bottom of the printed circuit board.

BRIEF DESCRIPTION OF THE PREFERRED EMBODIMENT

Figure 10:
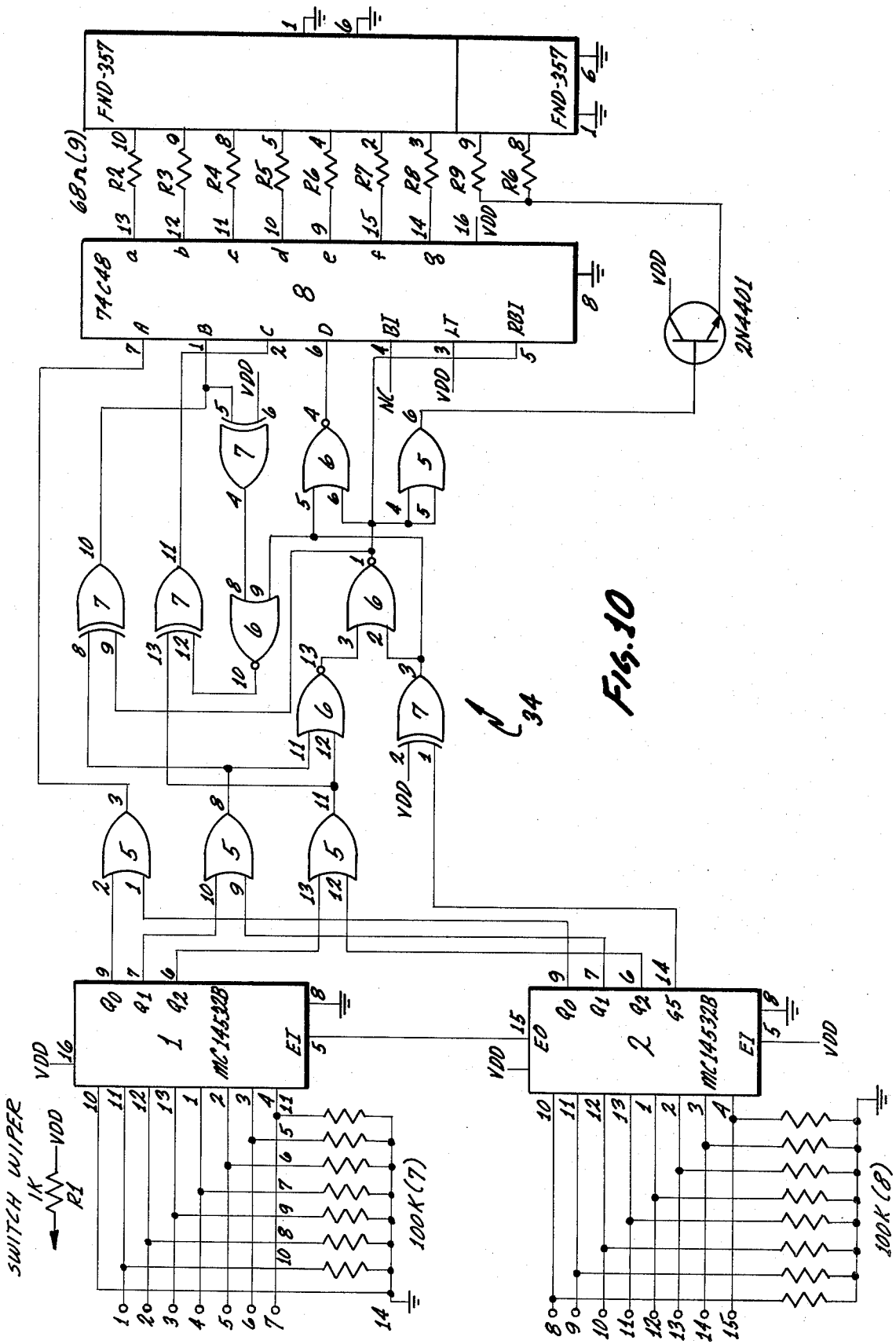
FIG. 10 is a schematic of the electrical circuitry, which interprets the mechanical position of the probe and displays the corresponding grip-length number.

The drawings show the measuring system constructed in accordance with the teachings of this invention, indicated in its entirety as 10, comprising a casing 12 from which extends a probe 14 for measuring the thickness of material or structural parts 16 which is displayed in terms of fastener grip lengths on a digital display 18 through an opening 20 in the casing 12.

The casing 12 comprises, in the embodiment shown, an elongated tubular body 22, of impact-resistant plastic with two end plugs or caps 24 and 26 of similar plastic, suitably shaped with shoulders, so as to be partially inserted within the tubular body. The end caps 24 and 26 with slots 28 and 30, locate a printed circuit board 32, within the casing. The printed circuit board 32 interconnects the circuitry 34, for sensing the position of a moveable part of the probe and for operating the display 18.

The probe 14 comprises an elongated rod 36 with a hook 38 at one end, and suitably threaded at 40 on the other end, for insertion into the end plug 24. The threads 40 are used in calibrating the system. The rod 36 sits in a hollow, moveable, tubular member 42 with a base ring 44 which, with the hook 38, forms the thickness gauging means. The tubular member 42 opposite the base ring 44 extends through the end cap 26, and terminates in a slide block 46 which has parallel resilient spring contact wipers 48 which engage terminals 50 and 52 on the printed circuit board 32. The slide block 46, spring contact wipers 48 and terminals 50 and 52 may be replaced by linear transducers, depending on application or need for closer tolerance control less than ±0.010 in. The terminal 52 comprises a number of individual terminal pads 54 each separately connected to the circuitry 34, which correspond to positions of the hook 38 relative to the base ring 44. The slide block 46 and tubular member 42 are spring loaded in one direction, i.e., away from the plug 24 by a helical spring 56 which surrounds the rod 36 and engages the slide block 46 around the end cap 24.

The base ring 44 is provided with a slot 58 to receive the hook 36, and allows the hook 36 to be recessed within the base ring when the gauge is not being utilized. In this position, the hook is protected by the base ring, should the measuring device be dropped. Movement of the rod 36 relative to the tubular member 42 causes one of the contact wipers 48 to engage pads 54 of the terminal 52, depending upon the distance between the surface 60 of the hook and the end surface 62 of the base ring 44. The distance difference is reflected by the display circuitry 34, showing a relative number on the display 18.

Two wipers 48 make an electrical connection between a voltage supply on one pad 50 to other pads 52 on the printed circuit board, depending on the physical position of the wipers 48. Two eight-bit priority encoders detect the signal on the pads 52 and active the circuit 34. The signals are processed through OR, NOR, and NOT OR integrated circuits until finally decoded by a seven segment decoder/driver, which drives the low-order digit of the two-light emitting diode (LED) displays. The high-order digit is driven directly by a switching transistor to minimize integrated circuit requirements. In the actual embodiment of this invention, the supply voltage used was 4.8 VDC and the catalogue numbers of the integrated circuits used are shown in FIGS. 10 and 11 with the electrical connection of all parts of the system being shown on both the top and bottom views of the printed circuit board in FIGS. 11 and 12.

The power drain of the CMOS integrated circuits is so low that the circuit is never turned off. Conversely, the high drain by the light-emitting diode displays necessitates them being automatically turned off in the probe's normal retracted position.

Resilient contacts 66 are located in suitable holes 68 in the end cap 24, and are connected to the positive and negative terminals of the battery 64, for the purpose of charging the battery without removing the end cap of the casing.

DEVICE OPERATION

Attention is now directed more particularly to FIGS. 1, 7, 8, and 9. FIG. 7 shows the position of the hook 36 and base ring 44 in the retracted position. The hook 36 is within the base ring where the surfaces 60 and 62 are in contact with one another. In this position, the wipers 48 are out of contact with the pads 52, so that the display is disconnected. Retraction is the result of the action of the spring 56.

When it is desired to measure the thickness of a workpiece, e.g., some structural part of an aircraft, the hook 38 is inserted into a fastener hole, such as shown in 70, large enough to allow the hook 38 to pass through but small enough to retain the slide ring 44. The insertion of the hook 38 compresses the spring 56. The inside hook edge 60 engages one side of the workpiece while the base ring edge 62 engages the opposite side. The distance between the two edges 60 and 62 corresponds to the thickness of the workpiece, as illustrated in FIGS. 1 and 8. In the inserted position (shown in FIG. 8), the wiper contact 48 engages one of the pads 54 which, through the operation of the circuitry, displays a predetermined number on the display 18. This number is calibrated according to the grip length of the fastener, which is to be selected for use in the hole 70 in the workpiece 16.

SYSTEM CALIBRATION

FIG. 9 is an illustration of a method of calibrating the probe to a grip length fastener system. To preset the operation of the system, the rod 36 is first extended through the forward end cap 26 and is threaded into the back cap 24 by a calibration tool 72 until the hook end is clearly within the base ring 44. This provides the necessary load on spring 56 and allows the hook to be automatically retracted. Arrows 74 in FIG. 2 show the total stroke of the wiper contacts.

To calibrate the system, a calibration gauge 76, shown in FIG. 9, is used. The gauge has a number of stepped increments, each representing groups of fastener grip lengths. Each step has a suitable hole, which corresponds in function to hole 70 of FIGS. 7 and 8, so the thickness can be measured. The calibration tool 72 fits over the hook 38 protruding through the calibration gauge. The hook is then rotated until the correct number lights up in the display 18. This is all that needs to be done for calibration since the pads 52 shown in FIG. 6 are correlated to groups of fastener grip lengths.

SUMMARY

From the foregoing, it can be seen that there is disclosed a measuring system for fastener grip lengths ideally suited for use in aircraft missiles, spacecraft, outer space antennas, satellites, telescopes and similar structures. It should be apparent that the electronic system may be changed i.e., the size, spacing, and number of contacts may be changed, so that different increments of material thickness (tube thickness, wall thickness, blind hold depth, etc.) can be measured.

What is claimed is:

1. A totally portable hand holdable measuring system for measuring various thicknesses of structural parts comprising,
   hollow tubular and elongated casing means usuable as a handle for holding the system,
   probe means extending from one end of said casing means, said probe means including means for measuring thicknesses of parts, said probe means includes a tube means slidable relative to said casing means and a rod positioned within said tube means and provided with a hook means adaptable to engage one side of a part to be measured, said rod being telescoped in said tube means, said tube means having on one end a part engaging face means which engages a side of said part opposite the side engaged by said hook means so that the thickness of a part may be measured between said hook means and said face means, said tube means being spring activated toward said hook means to provide a spring loaded measuring probe means,
   circuit means within said casing means and operated by said probe means, said circuit including digited electronic display means visible through an opening in said casing means for displaying the position of said measuring means of said probe as determined by the thickness of said parts, a plurality of individual terminal contact means aligned in a row direction parallel to the movement of said tube means, and,
   wiper contact means moveable with said tube means which contact individual terminals according to the position of said tube means for displaying a different number in said display means.

2. The measuring system as claimed in claim 1 wherein said tube means includes a ring means, said ring means including said part engaging face means, means in said ring means to receive said hook means within said ring means in response to the action of said spring means when said hook means and said face means are out (of hook means and said face means are out) of engagement with a part being measured.

3. The measuring system as claimed in claim 2 further including contact means in electrical communication with said circuit means for connecting to an outside power source for replenishing a power supply in said circuit means.

4. The measuring system as claimed in claim 3 further including cap means on one end of said casing means opposite said probe means and having means capable with said rod means for calibrating said thickness measuring function with said digital display means.

* * * * *